United States Patent [19]
Richards et al.

[11] Patent Number: 5,347,780
[45] Date of Patent: Sep. 20, 1994

[54] GYPSUM FIBERBOARD DOOR FRAME

[75] Inventors: Turner W. Richards, Conyers; Hubert C. Francis, Lithonia; George F. Fowler, Jr., Norcross, all of Ga.

[73] Assignee: Georgia-Pacific Corporation, Atlanta, Ga.

[21] Appl. No.: 932,785

[22] Filed: Aug. 20, 1992

Related U.S. Application Data

[63] Continuation-in-part of Ser. No. 420,362, Oct. 12, 1989, Pat. No. 5,171,366.

[51] Int. Cl.$^5$ .................................. B06B 1/08
[52] U.S. Cl. .................................. 52/204.1; 52/213; 52/232; 52/217; 49/504
[58] Field of Search ............. 52/212, 213, 217, 204.1, 52/232, 504; 49/504, 505

[56] References Cited

U.S. PATENT DOCUMENTS

| | | | |
|---|---|---|---|
| 749,762 | 1/1904 | Warner | 52/232 |
| 2,076,349 | 4/1937 | Porter et al. | 106/34 |
| 2,322,194 | 6/1943 | King | 106/88 |
| 2,882,175 | 4/1959 | Bailly | 106/115 |
| 2,913,308 | 11/1959 | Dailey . | |
| 3,376,147 | 4/1968 | Dean | 106/109 |
| 3,390,003 | 6/1968 | Cooper | 106/193 |
| 3,570,208 | 3/1971 | Nikai et al. | 52/746 |
| 3,616,173 | 10/1971 | Green et al. | 106/109 |
| 3,702,517 | 11/1972 | Martin | 52/213 |
| 3,839,059 | 10/1974 | Rothfelder et al. | 106/115 |
| 3,951,735 | 4/1976 | Kondo et al. | 106/112 |
| 4,045,268 | 8/1977 | Geschwender | 156/197 |
| 4,047,962 | 9/1977 | Copeland | 106/90 |
| 4,127,628 | 11/1978 | Uchida et al. | 264/42 |
| 4,159,302 | 6/1979 | Greve et al. | 264/333 |
| 4,174,230 | 11/1979 | Hashimoto et al. | 106/109 |
| 4,202,857 | 5/1980 | Lowe | 264/333 |
| 4,214,027 | 7/1980 | Knuaf et al. | 428/113 |
| 4,222,984 | 9/1980 | Ladwig | 264/261 |
| 4,239,716 | 12/1980 | Ishida et al. | 264/86 |
| 4,252,568 | 2/1981 | Bounini | 106/111 |
| 4,328,178 | 5/1982 | Kossatz | 264/69 |
| 4,343,127 | 8/1982 | Greve et al. | 52/785 |
| 4,557,973 | 12/1985 | Ali | 428/404 |
| 4,589,220 | 5/1986 | Warren | 52/217 |
| 4,589,229 | 5/1986 | Warren | 49/505 |
| 4,645,548 | 2/1987 | Take et al. | 156/39 |

(List continued on next page.)

FOREIGN PATENT DOCUMENTS

| | | |
|---|---|---|
| 2365161 | 7/1975 | Fed. Rep. of Germany . |
| 84216 | 7/1977 | Japan . |
| 92836 | 8/1978 | Japan . |
| 134814 | 11/1978 | Japan . |

(List continued on next page.)

OTHER PUBLICATIONS

Hodd and Turley, "High Modulus Fibres", *Chemistry in Britain*, vol. 14, No. 14, pp. 545–551 (Nov., 1978).

Kelly and Mileiko, editors, "High Performance Composites with Resin Matrices", *Fabrication of Composites*, Cp 1, pp. 1–9, 24–28 (1983).

T/C Publications, *Kevlar Composites*, pp. 53–55, based on selected papers from the Kevlar Composites Symposium (Dec., 1980, 1979).

(List continued on next page.)

*Primary Examiner*—James L. Ridgill, Jr.
*Attorney, Agent, or Firm*—Synnestvedt & Lechner

[57] ABSTRACT

A door frame having excellent fire-resistance, flexural strength and screw holding properties is fabricated from gypsum fiberboard, specifically a gypsum fiberboard having a density of at least 60 lbs./cu.ft., a flexural strength of at least about 30 lbs. (½" thick material), and a screw holding capability of at least about 400 lbs. A preferred gypsum fiberboard material for fabrication of the door frame comprises a composition containing a substantially uniform dispersion of solids including by weight about 65% to 90% set gypsum, about 7% to about 30% pulped paper, up to about 9% binder, and about 0.8% to 2% inorganic fiber. A wood veneer is preferably applied to the visible faces of the gypsum fiberboard door frame members.

11 Claims, 3 Drawing Sheets

U.S. PATENT DOCUMENTS

| | | | |
|---|---|---|---|
| 4,678,702 | 7/1987 | Lancaster et al. | 428/252 |
| 4,734,163 | 3/1988 | Eberhardt et al. | 264/82 |
| 4,748,771 | 6/1988 | Lehnert et al. | 52/813 |
| 4,810,569 | 3/1989 | Lehnert et al. | 428/285 |
| 4,811,538 | 3/1989 | Lehnert et al. | 52/455 |
| 4,840,688 | 6/1989 | Vogt | 156/39 |
| 5,155,959 | 10/1992 | Richards et al. | 52/455 |

FOREIGN PATENT DOCUMENTS

| | | |
|---|---|---|
| 106559 | 7/1982 | Japan . |
| 165615 | 9/1984 | Japan . |
| 171261 | 9/1985 | Japan . |
| 1217840 | 3/1986 | U.S.S.R. . |
| 1204541 | 9/1970 | United Kingdom . |
| 1536663 | 12/1978 | United Kingdom . |
| 2053184A | 2/1981 | United Kingdom . |

OTHER PUBLICATIONS

Louisiana–Pacific Trade Literature, "Louisiana–Pacific Fiberbond Fiber Gypsum Panel", 1-0-A/S 10M (Jan., 1990).

Highland American Corporation Trade Literature, "Gypsonite", (undated).

Weyerhauser Trade Literature, "Bullet-Resistant Doors", HP 1410 1-89 (1989).

Louisiana–Pacific Trade Literature for Fiberbond, fiber gypsum wallboard, (Apr., 1991).

Proceedings of the Second International Inorganic Bonded Wood and Fiber Composite Materials Conference, Kraemer and Lempfer, "Gypsum Fiberboard–History and Outlook," 1991, pp. 77–84.

Proceedings of the Second International Inorganic Bonded Wood and Fiber Composite Materials Conference, Natus, G., "Gypsum Fiberboard Production in Nova Scotia, Canada," 1991, pp. 85–87.

Proceedings of the Second International Inorganic Bonded Wood and Fiber Composite Materials Conference, Godfrey, J. "Experiences in Gypsonite Manufacturing," 1991, pp. 88–93.

Proceedings of the Second International Inorganic Bonded Wood and Fiber Composite Materials Conference, Takahashi Watanabe, Koga and Kaneko, "Gypsum–Cellulose Fiberboard by the Hatschek Process," 1991, p. 94.

Proceedings of the Second International Inorganic Bonded Wood and Fiber Composite Materials Conference, Furman, H., "Marketing Opportunities for Gypsum Fiberboard," 1991, pp. 133–135.

Sattler et al., "Gypsum–Bonded Particleboards and Fiberboards," *Fiber and Particleboards Bonded with Inorganic Binders*, pp. 19–25, (presented orally Oct. 24–26, 1988, copyright 1989).

Bahner et al., "New Equipment for Forming Gypsum and Cement Fiberboards from an Aqueous Slurry," *Fiber and Particleboards Bonded with Inorganic Binders*, pp. 94–97, (presented orally Oct. 24–26, 1988, copyright 1989).

R. Miller, "The Wurtex System for Gypsum Fiberboard," *Fiber and Particleboards Bonded with Inorganic Binders*, pp. 103–106, (presented orally Oct. 24–26, 1988, copyright 1989).

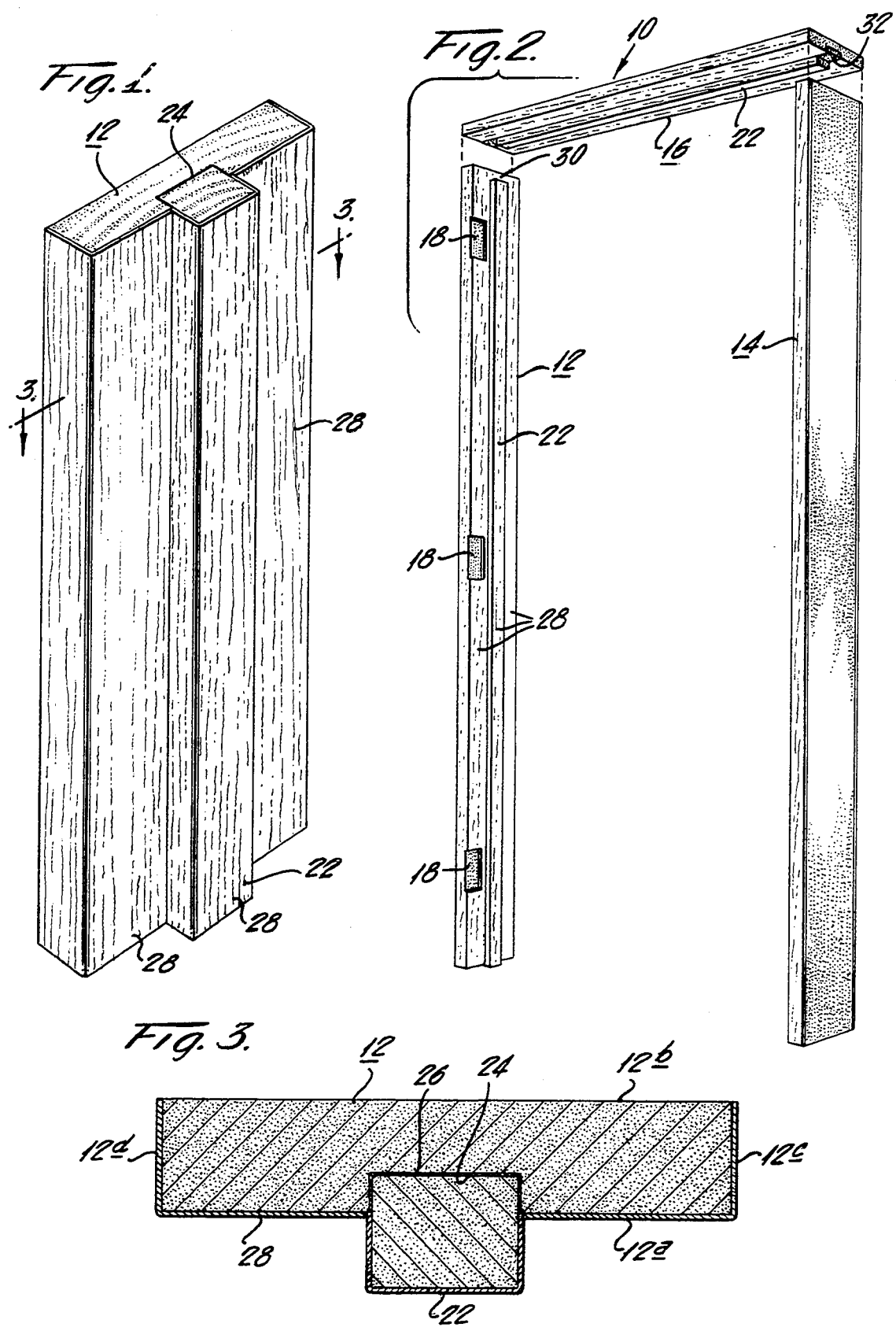

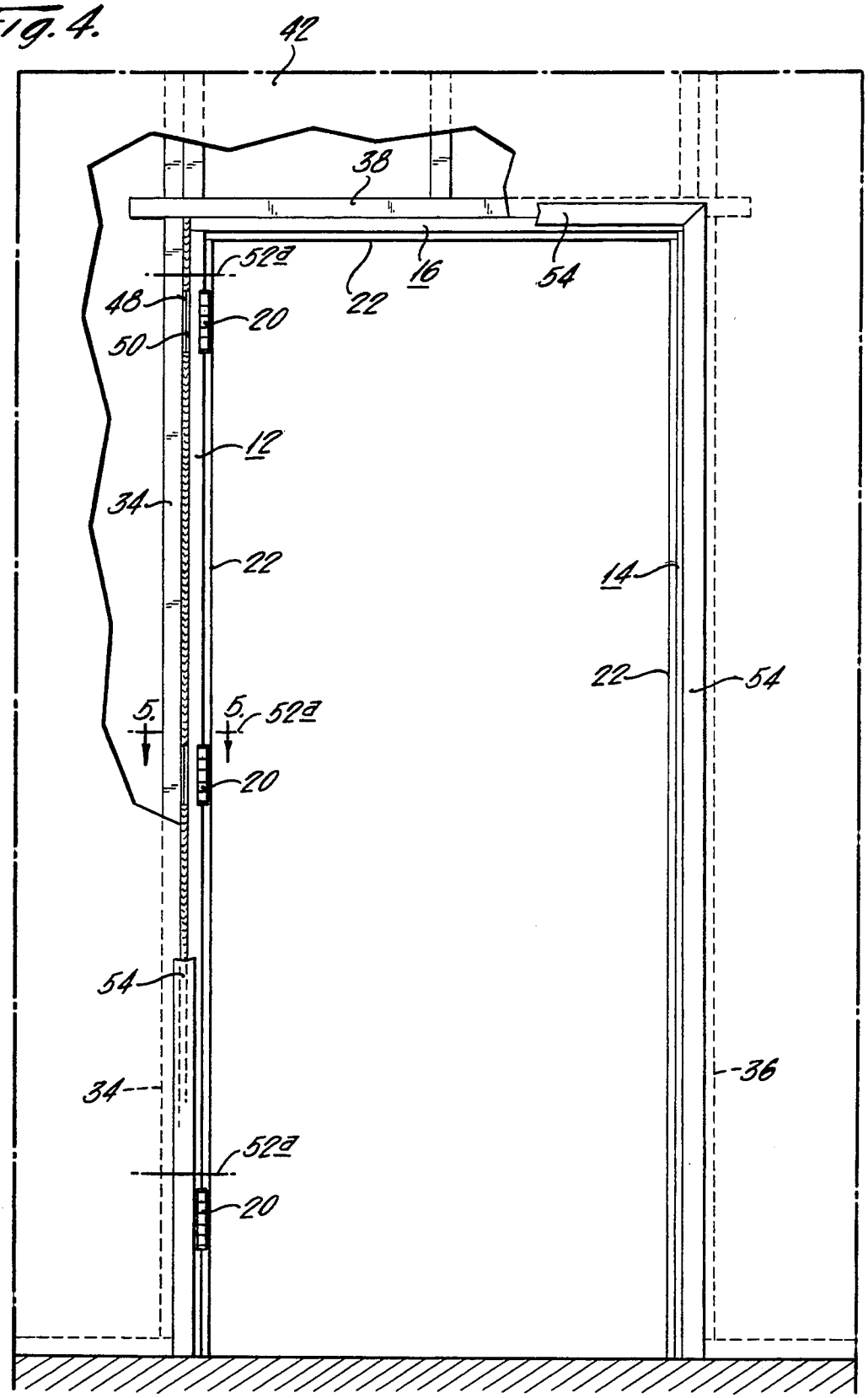

GYPSUM FIBERBOARD DOOR FRAME

CROSS REFERENCE TO RELATED APPLICATION

This application is a continuation-in-part of application Ser. No. 420,362, filed Oct. 12, 1989, now U.S. Pat. No. 5,171,366, issued on Dec. 15, 1992, and assigned to the assignee of the present invention.

FIELD OF THE INVENTION

This invention relates generally to door frames and relates more particularly to door frames fabricated from a fire retardant material.

BACKGROUND OF THE INVENTION

Historically, door frames and doors were made of wood. Wood has the advantages of being easily worked in the field using hand tools, can be stained or painted to match other wood trim or panelling in a room, and has good screw holding ability, permitting the secure mounting of hinges, strike plates, knobs and latches as well as other hardware, such as door closing devices.

One significant drawback of wood is its poor resistance to fire. With the increased emphasis on fire retarding properties of building materials, particularly commercial structures, as evidenced by modern building codes, wooden door frames are now utilized principally in residential construction.

In addition to its failure to meet fire test standards, there are other disadvantages of wood for use as a door framing material. The supply of clear wood stock is limited and costs have risen as a result. Techniques have been developed to fabricate longer wood members from a plurality of short pieces of clear wood stock but these techniques introduce additional steps and equipment and hence higher costs.

Other disadvantages of wood include its tendency to deform and even rot under moist circumstances, and it is subject to scarring from even minor impacts. Refinishing can also be troublesome, since scraping or sanding can, if not carefully controlled, deform the planar surfaces.

In view of the above, and particularly due to building codes requiring fire retardant doors and door frames, steel has become the material of choice for door frames where fire retardant properties are required. Although steel door frames do readily pass the required fire and hose stream tests, they suffer from other shortcomings. Steel cannot be readily worked at the building site and hence even minor adjustments such as to a door frame height, for example, cannot be readily accomplished in the field.

Furthermore, steel frames are typically prefabricated by welding, making handling difficult and taking up more shipping space than would be required if the frame members could be shipped in a knocked down condition. In addition, steel frames cannot be stained to match the remaining woodwork in a room and accordingly must either be painted or treated with applications which simulate a wood finish.

Because of its typical thin sections, steel presents complications in attaching hardware, and recesses for hinges and strike plates must be prefabricated, limiting the options at the work site. Finally, although steel door frames are highly resistant to denting, finishes are apt to chip upon impact due to the non-resilient nature of the steel.

There is accordingly a need for a door frame which provides adequate fire resistance at a relatively low cost, which can be easily modified at the construction site and which has good screw holding properties as well as an attractive finished appearance.

SUMMARY OF THE INVENTION

The present invention comprises a door frame construction wherein the frame members or jambs are formed of a gypsum fiberboard material. In a preferred form of the invention, the door frame members are made of a gypsum fiberboard which includes at least about 65 wt. % to about 90 wt. % set gypsum and about 7 wt. % to about 30 wt. % pulped paper with the paper pulp fibers being uniformly distributed through the board. The gypsum fiberboard from which the door frame is fabricated should have a density of at least about 60 lbs./cu.ft., a flexural strength of at least about 30 lbs. (one half inch thick material), and a screw-holding capacity of at least about 400 lbs.

The gypsum fiberboard door frame as described readily passes a sixty minute fire test as well as the requisite hose stream test for sixty minute rated openings. The screw holding capacity of the present door frame provides ample strength for attaching the door hinges, strike plates and other hardware. The gypsum fiberboard may be readily worked with carbide tipped wood working tools and hence the frame members may be assembled at the work site and trimmed as necessary to accommodate each installation.

The visible surfaces of the frame members are preferably covered such as by application of a wood veneer which may be adhesively applied to the gypsum fiberboard. In the alternative, the fiberboard could be sanded and painted.

STATEMENT OF THE OBJECTS

It is accordingly a first object of the present invention to provide a door frame assembly having good fire resistant properties.

A further object of the invention is to provide a door frame assembly as described which is fabricated from an inexpensive material.

Another object of the invention is to provide a door frame assembly as described, the dimensions of which can be modified at the building site with conventional wood working tools if required.

A still further object of the invention is to provide a door frame assembly as described having good screw holding properties.

Another object of the invention is to provide a door frame assembly as described which may be shipped in a knocked down condition and readily assembled at the building site.

Still another object of the invention is to provide a door frame assembly as described having an attractive appearance and which can be finished to match the finish of a wood door hung therein.

Additional objects and advantages of the invention will be more readily apparent from the following detailed description of a preferred embodiment thereof.

BRIEF DESCRIPTION OF THE DRAWINGS

FIG. 1 is a perspective view partly in section of a portion of a side jamb of a door frame assembly in accordance with the present invention;

FIG. 2 is an exploded perspective view of the present door frame, the jambs of which incorporate the structure shown in FIG. 1;

FIG. 3 is an enlarged sectional view taken along line 3—3 of FIG. 1;

FIG. 4 is an elevational view showing the door frame assembly of FIGS. 1-3 incorporated into a wall structure formed of metal studs and gypsum wallboard;

DESCRIPTION OF THE PREFERRED EMBODIMENT

Figure 5:
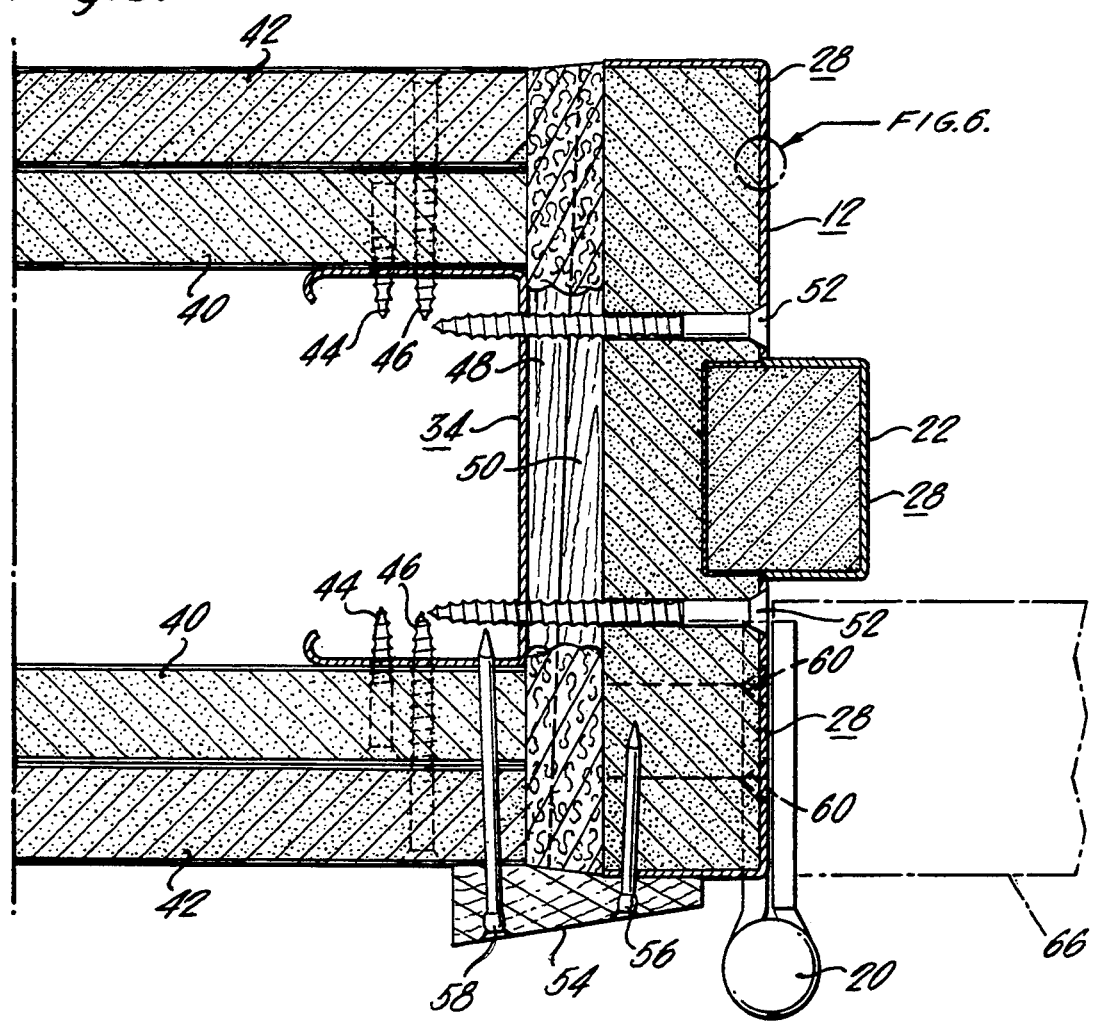
FIG. 5 is an enlarged sectional view taken along line 5—5 of FIG. 4 showing the manner in which the door frame assembly is attached to the wall structure.

Referring to the drawings and particularly FIG. 2 thereof, a door frame assembly generally designated 10 includes three principal frame members, a pair of side jambs 12 and 14, and a header jamb 16. The side jambs 12 and 14 are identical with the exception that the side jamb 12 includes recesses 18 to accept door hinges 20 (FIGS. 4 and 5). Although not shown, the side jamb 14 would typically include a recess for a strike plate, although this could if desired be readily cut at the installation site (as could the hinge recesses 18) in view of the workable nature of the material as will be presently described.

FIGS. 1 and 3 show the details of a portion of one of the jambs, in this instance the side jamb 12 although the other jambs 14 and 16 are identical in section. As shown in FIG. 3, the jamb 12 is rectangular in section, including a front or exposed face 12a, a rear face 12b and side edge faces 12c and 12d. Each jamb is formed of gypsum fiberboard having a density of at least about 60 lbs./cu. ft., a screw holding capacity of at least about 400 lbs., and a flexural strength of at least about 30 lbs. (one half inch thick material). The preferred type of gypsum fiberboard is that disclosed in application Ser. No. 420,362, filed Oct. 12, 1989 of which the present application is a continuation-in-part. The composition and characteristics of the preferred gypsum fiberboard are described in detail herebelow.

A stop molding 22 (described hereinafter simply as a stop) extends centrally along the front face of each of the three jambs 12, 14 and 16 comprising the door frame assembly 10. Each of the stops is formed of gypsum fiberboard and is seated in a groove 24 cut in the front face of each jamb. In the illustrated embodiment, the stops are secured to each jamb by means of an adhesive 26, although the stops may also be held in place by means of fasteners such as nails or screws, either alone or in combination with adhesive.

Figure 6:
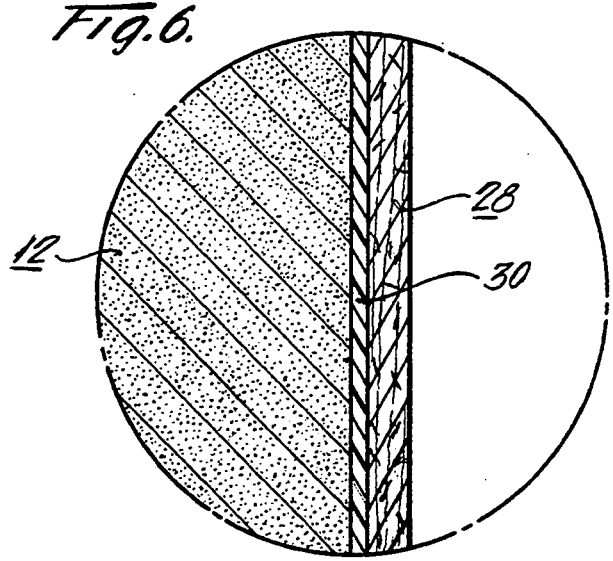
FIG. 6 is an enlarged sectional view of the circled area of FIG. 5 showing the wood veneer adhesively attached to the jamb surface.

A wood veneer 28 is bonded to the visible faces of each jamb and stop by means of an adhesive layer 30 as shown in FIG. 6. As shown in FIG. 3 for example, the wood veneer 28 covers all of the exterior faces of the jamb 12 and stop 22, the rear face 12b, which is hidden upon installation of the frame, being free of the wood veneer. The veneer is preferably sufficiently thin to permit its bending around the corners of the jamb and stop and hence to provide the finished appearance of a wooden door frame. The veneer is preferably left unfinished until after installation, whereupon the veneer may be stained or painted to match the finish of the door and perhaps other wood trim in the adjacent rooms.

The door frame assembly is preferably shipped in a knocked down condition to a building site and the three jambs, 12, 14 and 16 with their stops 22 in place and the veneer applied may be packaged in a compact bundle requiring little shipping space. The three jambs may, if desired, be fabricated slightly over length and trimmed at the installation site to accommodate the usual construction irregularities. The head jamb 16 as shown in FIGS. 2 and 4 is seated upon the side jambs on installation and may be secured thereto by nailing or screwing. The side jamb stops preferably terminate below the tops of the side jambs a distance equal to the protruding depth of the stop of the header jamb as illustrated in FIG. 2 at 30. Similarly, the header jamb stop is cut back from the ends of the header jamb as shown in FIG. 2 at 32 a distance equal to the thickness of the side jamb, thereby allowing the header jamb to seat on the side jambs with the header stop seated on the ends of the side jamb stops.

Since doors are conventionally made in a number of standard widths, the door frame assembly could, if desired, be shipped in the largest standard door width size, usually 36 inches, and the head jamb cut to the desired size at the site. Conventional woodworking tools such as a power saw may be used to cut the frame materials and the door frame widths can be established to suit the door size in a matter of minutes.

Similarly, should adjustment be required to the height of the door frame, the side jambs can be trimmed to suit the building irregularities or a non-standard door size. The high density of the gypsum fiberboard material and the presence of the fibers permit a clean sawing with little danger of chipping or breaking away the edges of the material.

The present door frame does not require any different supporting structure than that normally employed in commercial or residential construction. A typical commercial wall construction having fire retarding properties is illustrated in FIGS. 4 and 5, including a door opening in which is shown mounted a door frame assembly in accordance with the present invention. The wall is formed of steel studs and gypsum wallboard and in the region of the door opening as shown in FIG. 4 includes vertical steel jamb studs 34 and 36 supporting the steel header 38, which members form a rough opening slightly larger than that required to accommodate the door frame. As shown in FIG. 5, inner and outer layers of gypsum wallboard 40 and 42 are respectively secured to the studs by drywall screws 44 and 46 respectively. At least the outer wallboard layer is a fire resistant wallboard such as Georgia Pacific FIRESTOP wallboard.

With the head jamb 16 secured by nails or screws to the upper ends of the side jambs 12 and 14 to establish the desired width of the frame, the door frame assembly is positioned in the rough opening formed by the jamb studs 34 and 36 and header 38. The jambs are shimmed with tapered shim wedges 48 and 50 as shown in FIG. 5 such that the side jambs are plumb and parallel and the head jamb is perpendicular to the side jambs. The jambs are then secured to the studs by means of screws 52 which are countersunk flush with the exposed jamb surfaces. The shim wedges are preferably made of a fire-resistant material. On the jamb 12, the shim wedges as shown in FIG. 4 are preferably located at each hinge location and the screws 52 located one inch above each hinge along the center lines 52a. Similar screw spacing would be suitable for jambs 14 and 16.

The spaces between the jambs and the studs and header intermediate the shim wedges 48 are caulked with joint compound such as Georgia-Pacific Speed Set Joint Compound on both sides of the assembly to seal the opening between the gypsum wallboard end surfaces and the door frame.

Wood casing trim 54 around the perimeter of the door frame is secured by nails 56 directed into the jambs and nails 58 extending into the walls. Although shown on only one side of the door frame in FIG. 5, the trim 54 may also be applied on the opposite side as well if desired.

The hinges 20 are secured by flathead screws 60 which extend into the side jamb 12 as shown in broken lines in FIG. 5. A door 66, shown in dot/dash lines in FIG. 5, is secured to the hinges 20 in a conventional manner. The door 66 should, of course, have an appropriate fire rating for the particular installation conditions.

The gypsum-containing fiberboard composition for fabrication of the jambs and stop moldings will now be described. The fiberboard has a density of at least about 60 lbs/ft$^3$, flexural strength of at least 30 lbs ($\frac{1}{2}$ inch thick material), and screw-holding capacity, measured as defined hereinafter, of at least about 400 lbs. The fiberboard preferably does not include a paper facing, which is desirably absent to promote fire and water resistance properties. The preferred composition of the fiberboard is that disclosed in U.S. application Ser. No. 420,362 of which this application is a continuation-in-part, namely a uniform distribution of solids, which includes by weight, about 65% to about 90% set gypsum dihydrate, about 7% to about 30% cellulosic fiber, and preferably about 1.5% to about 35% of a performance booster selected from inorganic fiber, clay, vermiculite, starch and binder polymer.

One of the essential constituents of the preferred gypsum-containing fiberboard is calcium sulfate dihydrate. This constituent is derived from the hydration of any form of calcium sulfate which is capable of reacting with water to form set gypsum, that is, calcium sulfate dihydrate. The calcium sulphate is preferably in non-fibrous forth although a minor amount of a fibrous form of gypsum can be used as an optional ingredient. The calcium sulfate can be in anhydrous form or in the hemihydrate form, although it is believed that the hemihydrate form of calcium sulfate will be used most widely. Of the "alpha" and "beta" forms of the hemihydrate, use of the latter is preferred. The hemihydrate can be produced from the naturally-occurring gypsum mineral by heating, or calcining, the dihydrate.

One of the advantages of the present invention is that waste-type materials can be used in fabricating the preferred gypsum fiberboard. For example, there can be used as the source of the calcium sulfate the material known as "desulfurized by-product gypsum" which is produced by the desulfurization of flue gas. Another example of a waste- or scrap-type material that can be used in the practice of the present invention is scrap gypsum wallboard, which can be used as a source of both calcium sulfate and the paper constituent of the building product. This invention can employ any of the above-disclosed individual sources of calcium sulfate, but a mixture of the different sources of calcium sulfate can also be used.

In the use of an aqueous dispersion to make the gypsum-containing fiberboard, the non-fibrous calcium sulfate generally will comprise between about 53% and about 78% by weight of the total solids, preferably between about 55% and about 70% by weight.

The gypsum dihydrate content of the preferred fiberboard will be approximately 18.5% greater than the non-fibrous calcium sulfate content of the compositions from which they are made, the difference representing the added water of hydration in the set gypsum dihydrate. That is, by weight, the set gypsum will preferably comprise between about 65% and about 90%, preferably between about 70% and about 85% of the overall set composition.

The composition of the preferred fiberboard also employs a substantial amount of cellulosic fiber. Cellulosic fiber includes the fibrous component of plants, such as cotton, linen, and flax, for example. Among the various sources of cellulosic fiber, paper stock is conveniently employed. That is, the solid component involved in each of the aforesaid aspects of the invention preferably includes by weight about 7% to about 30% paper fiber, more preferably between about 10% and about 17%. The presence of the paper fiber provides good physical characteristics such as flexural strength, screw and nail holding, and surface hardness without having any separate surfacing membrane such as the paper facing on conventional gypsum wallboard.

The paper fiber can be derived from either virgin paper stock, or previously used, waste paper stock can be employed. The source of the paper can be wood, cotton or linen rags, straw, etc., the origin or history of the paper not being important factors. The paper may be a product of the sulfite process, the sulfate (Kraft paper) process, or other processes. Among the types of paper stock that have been successfully employed are virgin and brown Kraft papers, and especially, newsprint. Waste newspaper provides very satisfactory results, is inexpensive, and its use helps to overcome an environmental pollution problem. And, as mentioned hereinabove, the source of the paper stock can include the paper of recycled paper-faced gypsum wallboard.

The preferred gypsum fiberboard preferably includes one or more performance boosting additives. There will be desirably used one or more defoaming agents, dispersants, and accelerators, ingredients which are well known in the art and are employed at low concentration levels, generally each at less than about 1% by weight of the solids. In the aggregate the performance booster generally will comprise about 1.5% to about 35% by weight of the solids and will preferably be selected from inorganic fiber, clay, vermiculite, starch and binder polymer.

Inorganic fiber, as that term is employed herein, includes glass textile fiber and mineral wool. These latter terms are defined in U.S. Pat. No. 4,557,973, and those definitions are incorporated herein by reference. Briefly, the term "mineral wool" means glass or other mineral fibers prepared by attenuating a melt of glass, basalt, blast furnace slag or other vitreous mineral composition from the face of a heated centrifugal rotor or the like. This process is in contrast to that used to produce textile fibers, where the melt is drawn through an orifice. An especially useful and readily available type of mineral wool is glass wool as found in glass wool insulation material. Glass textile fiber and glass wool, jointly or severally, are referred to herein as "siliceous fiber." The glass textile fiber, also referred to as "fiberglass", generally will be chopped, e.g., the fibers may be about $\frac{1}{2}$ inch long. Siliceous fiber improves fire resistance, apparently by decreasing the tendency of the gypsum construction to crack under thermal stress. The siliceous fiber preferably comprises up to about 7% by weight and may include glass textile fiber and, in addition, glass wool, depending upon the specific product.

The performance booster may also include either clay or vermiculite, or both, especially if the intended board or panel requires excellent fire resistance. Both of these materials may be present in amounts up to about 6%. The clay to be employed will generally be kaolin clay, which is effective to control the shrinkage of the gypsum-containing construction under extreme heat. The vermiculite should be raw, or unexpanded vermiculite, which swells when heated, helping to control shrinkage of the construction and possible cracking.

The composition of the preferred fiberboard may also include a binder. The binder affects the physical properties of the fiberboard layer 13, especially its flexural strength, and also permits good fastener retention at lower density. Furthermore, the binder improves the surface characteristics of the board such as smoothing the surface and making it easier to finish.

The binder, when present, may comprise up to about 15% by weight of the solids, but preferably about 1% to about 3% by weight. A number of different natural and polymeric materials may be employed as binders, including natural binders such as raw, uncooked or cooked starch and synthetic polymers including homopolymers, such as poly(vinyl acetate) and polyacrylate, as well as copolymers, such as poly(ethylene)-co-(vinyl chloride), poly(styrene)-co-(butadiene), and poly(vinyl acetate)-co-(methyl acrylate). Among the various binder possibilities, esters of poly(vinyl alcohol) are especially effective, and poly(vinyl acetate) homopolymer is preferred. It is also convenient in most cases to introduce the binder as an aqueous emulsion, many of which are commercially available. In selecting the binder it is preferred to employ thermoplastic resins, which when applied to the surface of the fiberboards tend to form a tough, forgiving film, rather than a brittle film or one which is soft and has a very low tensile strength. Thermoplastic resins are also preferred since the heat required to set a thermosetting resin tends to calcine the gypsum in the preferred fiberboard compositions of this invention. One particularly useful resin emulsion, which is suitable for use as the resin polymer of the preferred fiberboard composition and as an adhesive for bonding the various sections and layers of this invention together, if necessary, is UCAR-130 poly(vinyl acetate) polymer by Union Carbide.

The composition for preparing the preferred fiberboard also includes water in an amount in vast excess of that required to react with and hydrate the calcined non-fibrous gypsum. That is, at least about a 25-fold excess amount of water should be present. Contrary to the conventional wisdom, the excess water provides processing advantages and leads to products which possess superior properties.

In the preferred continuous process for manufacturing boards and panels within the scope of the present invention, the aforementioned aqueous dispersion of constituents is formed into a sheet of indefinite length by the use of standard paper-making techniques. For example, the aqueous dispersion of constituents can be fed from a head box of the type associated with a paper-making machine to a foraminous moving belt through which water drains as the mass of solids coagulates and sets. The resulting composite sheet is consolidated by passing through press rolls. Heated rollers can also be used to dry the sheet.

Building materials within the scope of this invention, prepared by the process described hereinabove, were tested for flexural strength, as defined by the following procedure. These tests generally employed ASTM Method C 473-86a modified in that the specimens were ½ inch thick, 1 inch wide, and 4 inches long, with random orientation. In each case, the specimen was supported on bearings 3 inches apart, and the specimen was broken across the 1 inch width. Evaluation of flexural strength as a function of the density of fiberboards was undertaken, and the results appear in FIG. 4. The flexural strength of fiberboards within the scope of this invention generally should be at least about 30 lbs, preferably at least about 60 lbs (½ inch thick sample).

Fiberboards within the scope of this invention were evaluated for screw-holding capacity, as defined by the following procedure. In these tests, a specimen of material to be tested, dried to constant weight and ½ inch +/− 1/32 inch thick, at least 9 inches long, and nominally 1 9/16 inches wide, was employed. At midwidth, a 5/32 inch pilot hole was drilled to receive a No. 12 sheet metal screw. With the specimen supported on a wooden block or steel plate and the pilot hole centered over a ⅜ inch hole in the support, the screw was turned until the full shank thickness penetrated the specimen. Force was then applied vertically at the center of the screw, forcing the screw through the specimen, and the force was noted. In general, the screw-holding capacity of a building material within the scope of this invention is preferably at least about 400 lbs, and more preferably at least about 600 lbs, and most preferably in excess of about 700 lbs.

Preferred gypsum fiberboard compositions for fabrication of the present door frame are as follows, the percentages representing weight percentages of the product.

EXAMPLE 1

| Ingredient | Quantity-Wt. % |
|---|---|
| set gypsum | 78.8 |
| pulped paepr | 13.9 |
| binder (uncooked starch) | 6.89 |
| glass fiber | 0.41 |
| | 100.00% |

EXAMPLE 2

| Ingredient | Quantity-Wt. % |
|---|---|
| set gypsum | 80.12 |
| pulped paper | 14.24 |
| binder (uncooked starch) | 1.84 |
| glass fiber | 1.6 |
| vermiculite | 2.2 |
| | 100.00% |

These compositions produce a gypsum fiberboard product having a density of between 70 and 80 lbs/ft.³, a screw holding capability of over 1000 lbs., and a flexural strength in excess of 40 lbs. (½ thick material).

A fire resistant door frame in accordance with the present invention fabricated from the gypsum fiberboard composition of Example 1 and installed in the manner shown in FIGS. 4 and 5 in combination with a 90 minute rated door has readily passed a 60 fire endurance and hose stream test. The tests were conducted in accordance with ASTM E-152, CAN4 S-104, CSFM 12-43-4, NFPA 252, UBC 43.2, and UL-10B for 60 minute rated assemblies. The door and frame met the fire endurance requirements of the standards of the BOCA National Building Code, the Standard Building Code and the Uniform Building Code for 60 minute rated openings.

While the invention has been described with particular reference to a specific embodiment, it will be understood that it may be embodied in a variety of forms diverse from those specifically shown and described, without departing from the spirit and scope of the invention.

We claim:

1. A fire-resistant door frame comprising a pair of spaced vertical gypsum fiberboard side jambs connected at their upper ends by a horizontal gypsum fiberboard head jamb, said gypsum fiberboard jambs each comprising at least about 65 wt. % set gypsum dihydrate and at least about 7 wt. % reinforcing fibers substantially uniformly distributed therethrough, said gypsum fiberboard jambs having a screw-holding capacity of at least about 400 lbs.

2. The invention as claimed in claim 1, wherein said gypsum fiberboard side jambs and head jamb comprise a composition having a density of at least 60 lbs./cu.ft.

3. The invention as claimed in claim 1, wherein said gypsum fiberboard side jambs and head jamb have a flexural strength of at least about 30 lbs. (½" thick material).

4. The invention as claimed in claim 1, wherein said gypsum fiberboard side jambs and head jamb comprise a composition containing a substantially uniform dispersion of solids including by weight about 65% to about 90% set gypsum, about 7% to about 30% pulped paper, up to about 9% binder, and about 0.8% to about 2% inorganic fiber.

5. The invention as claimed in claim 1, wherein said gypsum fiberboard side jambs and head jamb comprise a composition containing a substantially uniform dispersion of solids including by weight about 65% to about 90% set gypsum and about 7% to about 30% reinforcing fibers.

6. The invention as claimed in claim 5, wherein said reinforcing fibers comprise pulped paper.

7. A fiber-resistant door frame comprising a pair of spaced vertical gypsum fiberboard side jambs connected at their upper ends by a horizontal gypsum fiberboard head jamb, said gypsum fiberboard jambs each comprising a composition including at least about 65 wt. % set gypsum dihydrate and at least about 7 wt. % reinforcing fibers substantially uniformly distributed therethrough, said composition having a density of at least 60 lbs./cu.ft., a screw holding capacity of at least about 700 lbs. and a flexural strength of at least about 30 lbs. (½" thick material).

8. The invention as claimed in claim 7, wherein said composition contains a substantially uniform dispersion of solids including by weight about 65% to about 90% set gypsum and about 7% to about 30% pulped paper.

9. The invention as claimed in claim 7, wherein said composition contains a substantially uniform dispersion of solids including by weight about 75% to about 90% set, about 7% to about 30% pulped paper, about 9% binder polymer, and about 0.8% to about 2% inorganic fiber.

10. The invention as claimed in claim 7, wherein said jambs each include a stop molding of gypsum fiberboard on the inner face thereof.

11. The invention as claimed in claim 7, wherein the exposed faces of said jambs are covered with a wood veneer.

* * * * *